(No Model.)
R. R. JONES.
CARPET STRETCHER.
No. 334,665.  Patented Jan. 19, 1886.
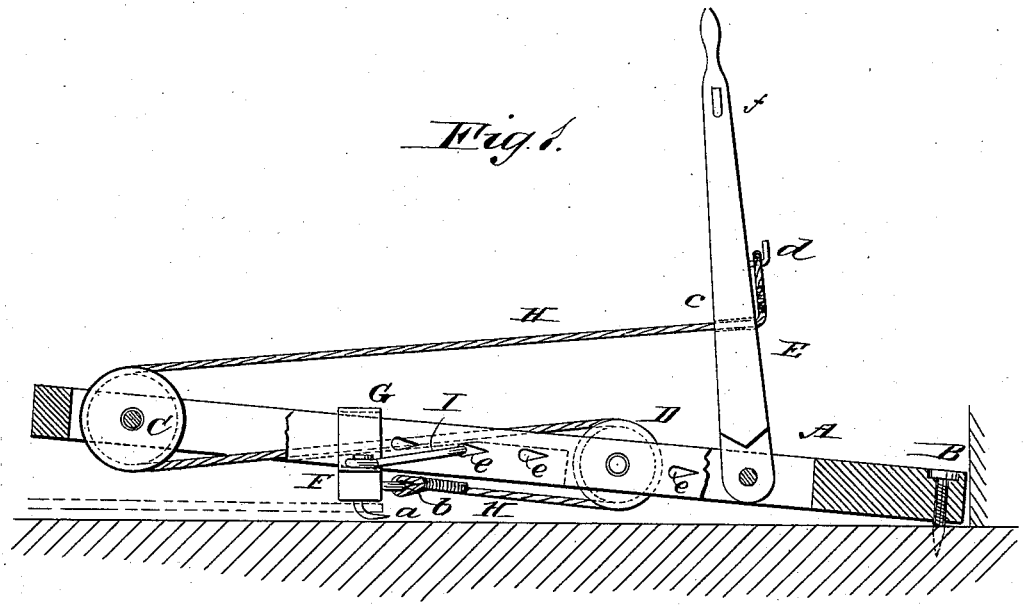
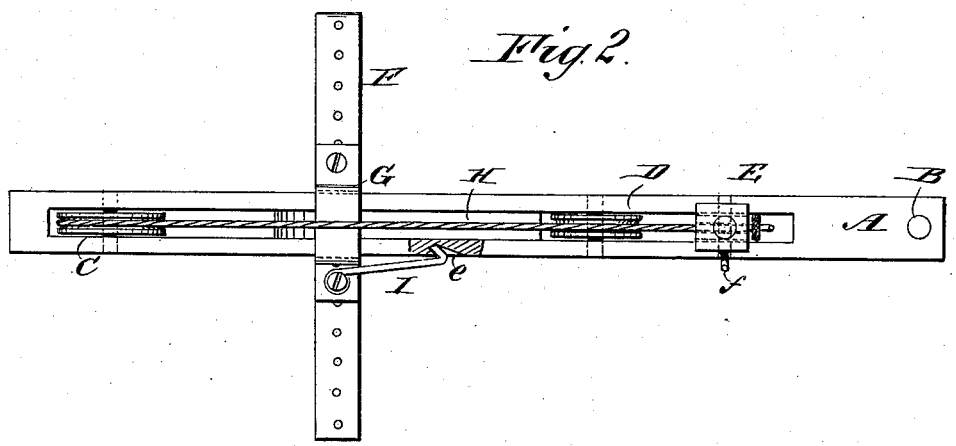
WITNESSES:
H. McArdle
C. Sedgwick
INVENTOR:
R. R. Jones
BY Munn & Co.
ATTORNEYS.

UNITED STATES PATENT OFFICE.

ROBERT R. JONES, OF BLOSSBURG, PENNSYLVANIA.

CARPET-STRETCHER.

SPECIFICATION forming part of Letters Patent No. 334,665, dated January 19, 1886.

Application filed April 10, 1885. Serial No. 161,822. (No model.)

*To all whom it may concern:*

Be it known that I, ROBERT R. JONES, residing in Blossburg, in the county of Tioga and State of Pennsylvania, have invented a new and Improved Carpet-Stretcher, of which the following is a full, clear, and exact description.

Reference is to be had to the accompanying drawings, forming a part of this specification, in which similar letters of reference indicate corresponding parts in both the figures.

Figure 1 is a side elevation, partly in section, of my improved carpet-stretcher. Fig. 2 is a plan view with a part broken away to more clearly show the construction.

The object of my invention is to provide a simple and effective carpet-stretcher which may be operated by one person, and the use of which will not mar the wall or base-board nor injure the carpet.

My invention consists in a bar having at one end a spur to be driven into the floor, and provided with pulleys, a lever, and a rope, and in the combination therewith of a sliding cross-head carrying pointed teeth or hooks for engaging the carpet.

The bar A is provided at one end with a spur, B, to be driven into the floor near the base-board, and in mortises in the said bar are pivoted the sheave C D and the lever E. The lever E is located near the spur B, the sheave D is placed near the fulcrum of the lever E, and the sheave C is located in the end of the bar A remote from the spur B. A transverse bar, F, provided with pointed hooked teeth $a$, is placed below the bar A, and provided with a metallic loop, G, which surrounds the top and sides of the said bar A, and forms a guide for maintaining the bar F in its proper relation to the bar A as it is moved along in the operation of stretching carpet. An eye, $b$, projects from the side of the bar F toward the spur B and receives a cord, H, which passes forward under the sheave D; thence over it, through the mortise in the bar A, under the sheave C; thence over it and through an aperture, $c$, in the lever E; thence upward to a hook $d$, projecting from the edge of the lever E. In the side of the bar A are formed several inclined holes, $e$, for receiving a hook, I, pivoted to the bar F.

The operation of my improved carpet stretcher is as follows: The spur B being driven into the floor near the base-board, the cross bar F is moved toward the outer end of the bar A, and its hooks are entered into the carpet, when a forward movement of the lever E toward the spur B will, through the cord H move the cross-bar F forward, and when it has been drawn as far as desired the hook I is inserted in one of the holes $e$, which retains the cross-bar in the position into which it is drawn by the lever E, when the carpet may be nailed.

If desired, when the carpet is drawn forward and retained by the hook I the loop on the lever end of the rope H may be detached from the hook $d$ and placed upon the hook $f$, near the upper end of the lever, thereby allowing the lever to be held out of the way to permit of nailing the edge of the carpet.

Having thus fully described my invention, I claim as new and desire to secure by Letters Patent—

1. The combination, in a carpet stretcher, of a mortised bar having a spur in one end, two sheaves and a lever journaled in the mortises of the said bar, a transverse cross-bar carrying pointed hooks, and a rope extending around the sheaves and connecting the cross-bar with the lever, as herein specified.

2. In a carpet-stretcher, the combination, with the actuating-lever E and rope H, of the hooks $d\,f$, projecting from the said lever E, as herein described.

ROBERT R. JONES.

Witnesses:
WM. L. RICHARDS,
E. L. RUSSELL.